Jan. 16, 1968     J. B. JOWERS     3,363,311
GRAPEFRUIT CUTTER
Filed Feb. 3, 1967
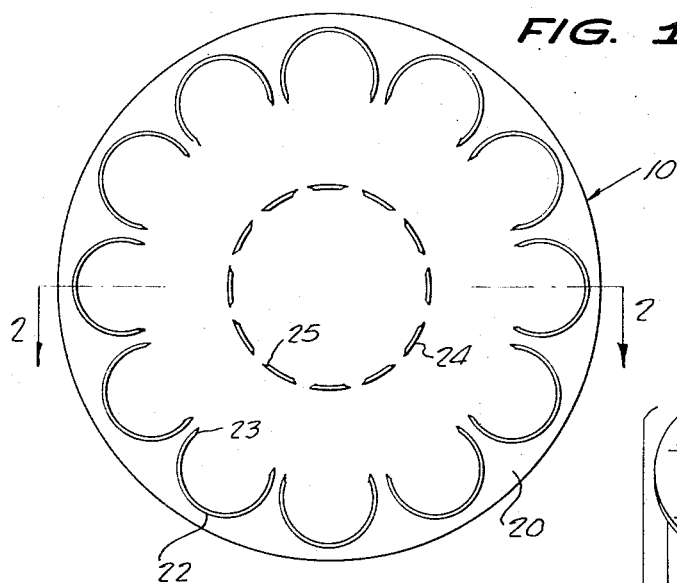
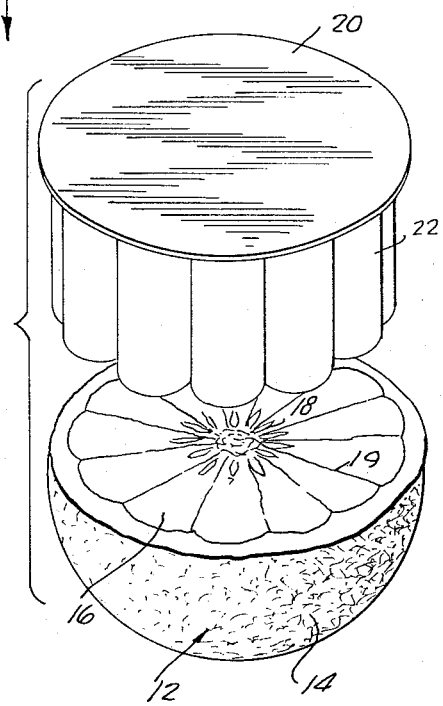
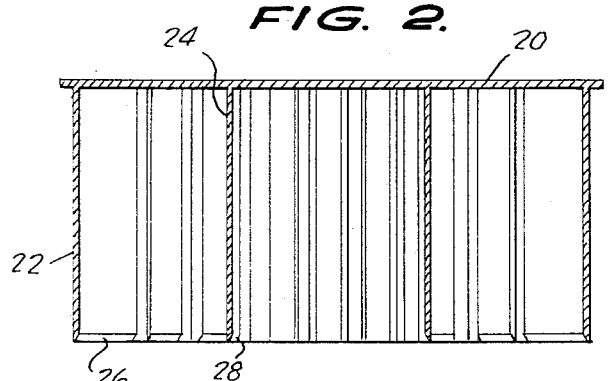
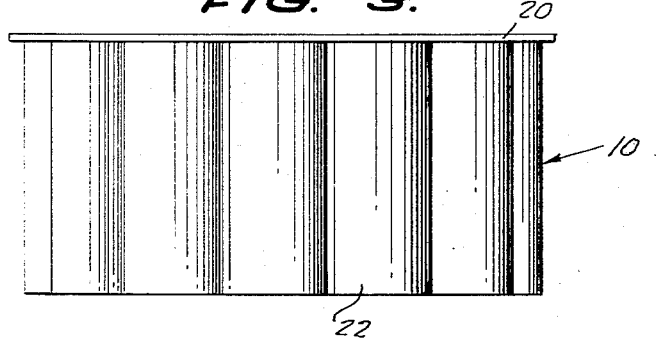
INVENTOR.
JAMES B. JOWERS,
BY
Berman, Davidson & Berman
ATTORNEYS.

United States Patent Office 3,363,311
Patented Jan. 16, 1968

3,363,311
GRAPEFRUIT CUTTER
James B. Jowers, 225 Howard Ave.,
Brooklyn, N.Y. 11233
Filed Feb. 3, 1967, Ser. No. 613,838
2 Claims. (Cl. 30—24)

ABSTRACT OF THE DISCLOSURE

A grapefruit cutter for separating segments of the fruit from its rind and core. Vertically depending, flexible, U-shaped cutting elements extend about the circumference of the cutter for coaction with radially spaced vertically depending blades for cutting the fruit into wedge-shaped portions along its membranes.

---

This invention relates to a device for cutting the pulp of a grapefruit into wedge-shaped sections along its membranes that may be more easily extracted from the rind, while at the same time separating the pulp from the core of the fruit, and constitutes an improvement of the cutter disclosed in my prior Patent No. 2,726,440.

In my prior patent, the cutter is provided with an outer series of depending cutter blades and an inner series of cutter blades, the inner series being adapted to extend about and cut away the core of the fruit, and the outer series cooperating with the inner series to cut away the pulp from the rind, so that the pulp is separated both from the core and rind and can be readily extracted. The inner and outer series of blades are formed from resilient, spring-like material, so that the blades will, as the cutter is moved downwardly into the fruit, flex and conform to the curvature of the grapefruit half.

An object of this invention is to form the outer series of cutter blades with U-shaped cross-sections, the legs of said U-shaped members adapted to extend along the membranes of the fruit separating the pulp segments, whereby as the cutter is moved downwardly into the fruit, the legs of the U-shaped outer series of blades conforming to the curvature of the rind, will move radially along the fruit membranes towards the inner series of blades to substantially sever the fruit into wedge-shaped segments.

A still further object of this invention resides in its improved cutting action, while maintaining the cutter of simple construction.

Other objects will appear from the following description and claims, and from the annexed drawing, in which:

FIGURE 1 is a bottom plan view of the grapefruit cutter constituting the subject matter of the instant invention;

FIGURE 2 is a cross-sectional view taken substantially along the plane indicated by lines 2—2 of FIGURE 1;

FIGURE 3 is a side elevational view of the cutter; and

FIGURE 4 is an exploded perspective view of the cutter and a grapefruit half, just prior to the cutter being inserted into the grapefruit.

Referring now to the drawing, wherein like numerals indicate like elements throughout the several views, the reference numeral 10 generally indicates the cutter constituting the present invention. 12 generally designates a half section or portion of a grapefruit to be cut, said grapefruit portion including a rind 14, an edible pulp 16, a core 18, and membranes 19 separating the pulp into segments.

The cutter 10 may be fabricated from any desired material having the required inherent qualities of flexibility such as spring metal, plastics, etc. The cutter comprises a flat, circular body 20, having a circumferential series of outer, depending cutter blades 22. The cutter blades 22 are relatively wide and U-shaped in cross-section, and are spaced short distances apart uniformly throughout the entire circumference of the device. In the illustrated, preferred embodiment, twelve such blades are provided, although the number of blades can of course be changed if desired.

Also depending from the circular body 20 is an inner series of elongated cutter blades 24. These are substantially coextensive in length with the blades of the outer series, and like the blades of the outer series, are formed from thin, flat, resilient material so as to permit them to be readily flexed resiliently when the cutter is inserted into the grapefruit.

At their lower ends, the several blades 22, 24 are formed with sharpened cutting edges 26, 28 respectively, while at their side edges, they are provided with cutting edges 23 and 25, respectively, to facilitate the insertion of the device fully into the grapefruit.

The blades 22, 24 can of course be secured to the underside of the body 20 in any suitable manner, and if not formed integrally with the body, can be soldered thereto or otherwise fixedly attached.

It will be noted that the annular outer and inner series are concentric with one another and with the body 20. The number of outer cutting blades is equal to the number of inner cutting blades. Further, the cutting edges 25 of the respective inner blades are aligned radially of the device with the cutting edges 23 of the legs of the corresponding U-shaped outer blades, as shown in FIGURE 1. By reason of this arrangement, the inner and outer blades are, in effect, paired, and are adapted to be entered between the radially extending membranes or partitions 19 of the grapefruit.

In use of the device, the body 20 is grasped, and is positioned over the grapefruit substantially in concentric relation thereto. Then, the body is forced downwardly into the grapefruit, and the outer series of cutter blades, as well as the inner series, will move substantially to the bottom of the grapefruit, being resiliently flexed inwardly by the changing curvature of the rind and pulp. Because of the U-shaped cross-section of each blade 22, the cutting edges 23 will move along the membranes 19, as well, until they are spaced a slight distance from their corresponding inner blades 24.

When the device has been entered into the grapefruit to the maximum extent, the pulp will have been cut away from the rind in wedge-shaped segments, and further, will have been separated from the core 18. Therefore, when the device is removed, the pulp will be easily extractable from the rind, in wedge-shaped segments.

The device would, of course, in a commercial embodiment be formed of some noncorrosive material such as stainless steel.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

What is claimed is:

1. A grapefruit cutter comprising a flat, circular body, an outer series of cutter blades substantially U-shaped in cross-section depending from said body, the blades of said outer series being spaced uniformly about the periphery of the body through the full circumference thereof, and an inner series of cutter blades depending from the body, the blades of the inner series being spaced a substantial distance radially inwardly from the outer series and being concentric with the outer series, the blades of said outer and inner series include sharpened cutting edges along their extremities, the blades of said outer series being adapted to enter between the rind and pulp of a grapefruit along its membranes, and the blades of the inner series being adapted to enter between the pulp and core of said grapefruit, the blades of the outer and inner series being formed of spring material so as to flex resiliently toward the center of the body responsive to movement of the body inwardly of the curving rind and core of the grapefruit.

2. A grapefruit cutter in accordance with claim 1 wherein the blades of the inner series are substantially narrower in width than the blades of the outer series and correspond in number to the blades of the outer series, and the edges of corresponding blades of the inner and outer series being in radial alignment with one another.

References Cited
UNITED STATES PATENTS

| | | | |
|---|---|---|---|
| 934,840 | 9/1909 | Ross | 30—279 |
| 2,726,440 | 12/1955 | Jowers | 30—24 |

OTHELL M. SIMPSON, *Primary Examiner.*

G. WEIDENFELD, *Assistant Examiner.*